Feb. 22, 1938. O. L. BEARDSLEY 2,108,792
GUN CARRIAGE
Filed Sept. 18, 1936
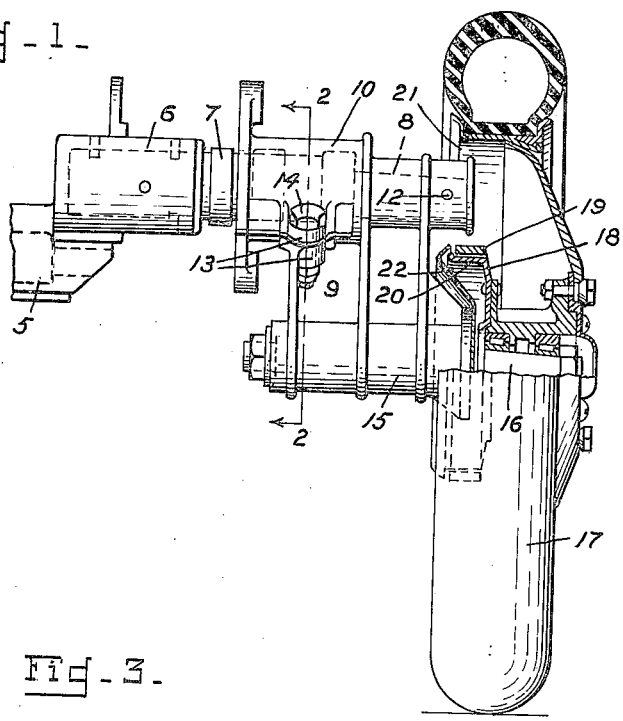
Fig-1-
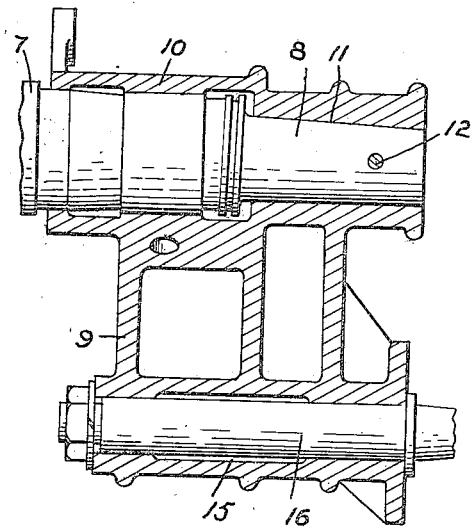
Fig-3-
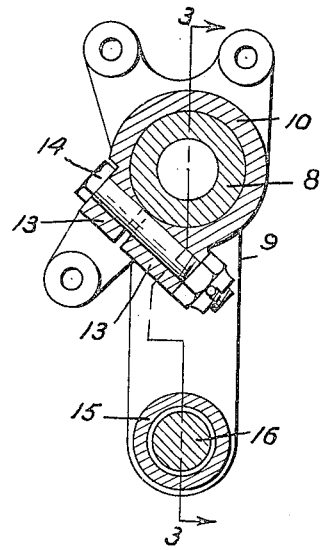
Fig-2-
Inventor
Orie L. Beardsley
By W. N. Roach
Attorney Patented Feb. 22, 1938

2,108,792

UNITED STATES PATENT OFFICE 2,108,792

GUN CARRIAGE

Orie L. Beardsley, Gary, Ind.

Application September 18, 1936, Serial No. 101,443

1 Claim. (Cl. 89—40)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a gun carriage and more particularly it has reference to the modification of an existing gun carriage by replacing the wheels with wheels of smaller diameter.

In my prior Patent 1,956,557 of May 1, 1934, I have shown a method of modifying an existing 75 m/m gun carriage of the French type, having a single trail slidable on the axle. In the present application the modification is applied to a gun carriage of a different type, the invention consisting in the manner of attaching a crank arm on each end of the axle and arranging it to provide ample bearing surface without unduly separating the wheels.

To these and other ends, the invention consists in the construction, arrangement and combination of elements described hereinafter and pointed out in the claim forming a part of this specification.

A practical embodiment of the invention is illustrated in the accompanying drawing, wherein:

Fig. 1 is a view in elevation of a portion of a gun carriage with a wheel shown partly in section.

Fig. 2 is a sectional view on the line 2—2 of Fig. 1.

Fig. 3 is a sectional view on the line 3—3 of Fig. 2.

Referring to the drawing by characters of reference there is shown a portion of a gun carriage which comprises an axle 5 having on each end (only one end being shown), a socket 6 in which is secured an axle arm 7 whose end is formed into a spindle 8 adapted to originally carry a wheel of large diameter. As seen most clearly in Fig. 3, the axis of the spindle is inclined with respect to the axis of the axle arm 7 for the purpose of canting the wheel, and this inclination is provided for while maintaining the under side of the spindle parallel to the axis of the arm. In modifying the original gun carriage to take a smaller wheel, the outer end of each spindle is cut away and only that portion shown in the drawing is retained.

A crank arm 9 is provided for each end of the axle and is formed with a bearing 10 fitted on a part of the axle arm 7 and coextensive with the spindle 8. The portion of the bearing that is mounted on the spindle 8 has an opening 11 that is shaped to exactly correspond to and receive the inclined spindle. The bearing 10 is held in place by means of a tapered pin 12 passing through the bearing and the spindle 8 and also by means of a clamp formed by splitting the inner end of the bearing and providing on the split ends apertured lugs 13—13 for receiving a clamping bolt 14.

A bearing 15 in the lower part of each crank arm carries a spindle 16 having a projecting outer end on which is mounted a wheel 17 of small diameter. The hub of the wheel carries a brake drum 18 which is to be used in conjunction with a braking mechanism indicated by the brake band 19. The outer end of the upper bearing 10 is disposed between the rim 20 of the brake drum 18 and the rim 21 of the wheel. The inner or open side of the brake drum is shielded by a plate 22 fixed to the bearing 15.

The crank arm may be easily and quickly applied to the end of an axle and has sufficient bearing surface on the axle to enable a gun to be fired from the carriage without danger of injuring the wheel mounting.

I claim:

In combination with a gun carriage provided with an axle terminating in spindles adapted to receive the usual artillery wheel, crank arms, a bearing at the upper end of each crank arm to receive their respective spindles and adjacent portions of the axle, the extent of the portion receiving the axle being at least as great as that receiving the spindle, means for securing the bearing in place, a bearing at the lower end of each crank arm and a spindle for mounting a wheel carried by each bearing.

ORIE L. BEARDSLEY.